(12) United States Patent
Fukatsu et al.

(10) Patent No.: US 8,881,563 B2
(45) Date of Patent: Nov. 11, 2014

(54) ELECTRIC STEERING WHEEL LOCK DEVICE AND MOTOR DAMPING STRUCTURE

(75) Inventors: Tomohiro Fukatsu, Aichi (JP); Masanari Okuno, Aichi (JP); Nobuhisa Inoue, Mie-ken (JP)

(73) Assignees: Kabushiki Kaisha Tokai Rika Denki Seisakusho, Aichi (JP); Toyota Jidosha Kabushiki Kaisha, Aichi-Ken (JP)

( * ) Notice: Subject to any disclaimer, the term of this patent is extended or adjusted under 35 U.S.C. 154(b) by 803 days.

(21) Appl. No.: 12/570,876

(22) Filed: Sep. 30, 2009

(65) Prior Publication Data

US 2010/0083716 A1 Apr. 8, 2010

(30) Foreign Application Priority Data

Oct. 3, 2008 (JP) ................................ 2008-258408

(51) Int. Cl.
*B60R 25/02* (2013.01)
*B60R 25/0215* (2013.01)

(52) U.S. Cl.
CPC .............................. *B60R 25/02153* (2013.01)
USPC ............................................. 70/186; 310/91

(58) Field of Classification Search
CPC ................... B60R 25/02153; B60R 25/02126; B60R 25/02128; B60R 25/02115; B60R 25/02142; B60R 25/02113; B60R 25/02147; B60R 25/007; B60R 25/02136; B60R 25/02; B60R 25/021; B60R 25/02107; B60R 25/02144; B60R 25/0211; B62H 5/06

USPC ......... 70/182–186, 252; 310/89, 91; 248/671, 248/674, 316.1, 316.7; 403/329; 192/222, 192/226; 74/492, 493
See application file for complete search history.

(56) References Cited

U.S. PATENT DOCUMENTS

| | | | | |
|---|---|---|---|---|
| 1,359,213 A | * | 11/1920 | Welch | 70/183 |
| 2,486,931 A | * | 11/1949 | Edwards et al. | 338/182 |
| 2,740,735 A | * | 4/1956 | Swain | 148/532 |
| 3,531,076 A | * | 9/1970 | Bang | 248/316.7 |
| 4,638,882 A | * | 1/1987 | Sato | 180/287 |
| 4,780,063 A | * | 10/1988 | Tuckey | 417/360 |
| 5,249,444 A | * | 10/1993 | Dancs | 70/380 |

(Continued)

FOREIGN PATENT DOCUMENTS

| | | |
|---|---|---|
| JP | 3-28137 | 3/1991 |
| JP | 7-40290 | 7/1995 |

(Continued)

OTHER PUBLICATIONS

English Language Abstract of JP 2001-258199.

(Continued)

*Primary Examiner* — Lloyd Gall
(74) *Attorney, Agent, or Firm* — Novak Druce Connolly Bove + Quigg LLP

(57) ABSTRACT

An electric steering wheel lock device including a lock bar which moves between a lock position, at which the lock bar prohibits rotation of a steering shaft, and an unlock position, at which the lock bar permits rotation of the steering shaft. An electric motor generates drive force for moving the lock bar. A motor holding member for holding the electric motor includes a motor fastening portion having two contact portions, which face toward each other, to clamp a casing of the electric motor.

5 Claims, 5 Drawing Sheets

(56) References Cited

U.S. PATENT DOCUMENTS

| | | | |
|---|---|---|---|
| 5,275,027 A * | 1/1994 | Eklof et al. | 70/14 |
| 5,394,039 A * | 2/1995 | Suchdev et al. | 310/51 |
| 5,564,308 A * | 10/1996 | Hoshikawa et al. | 74/89.14 |
| 5,632,168 A * | 5/1997 | Yano | 70/278.3 |
| 5,755,121 A * | 5/1998 | Crass | 70/52 |
| 5,974,844 A * | 11/1999 | Harrelson et al. | 70/408 |
| 5,992,187 A * | 11/1999 | Derman | 70/58 |
| 6,098,256 A * | 8/2000 | Poussard | 24/704.1 |
| 6,164,101 A * | 12/2000 | Kito et al. | 70/278.3 |
| 6,276,179 B1 * | 8/2001 | Janssen et al. | 70/278.3 |
| 6,516,640 B2 * | 2/2003 | Jacobs et al. | 70/186 |
| 6,648,542 B2 * | 11/2003 | Smith et al. | 403/291 |
| 7,078,835 B2 * | 7/2006 | Gross et al. | 310/89 |
| 7,458,241 B2 * | 12/2008 | Belden, Jr. | 70/57.1 |
| 7,475,577 B2 * | 1/2009 | Taniguchi et al. | 70/186 |
| 7,596,975 B1 * | 10/2009 | Yuan et al. | 70/134 |
| 8,234,894 B2 * | 8/2012 | Taniguchi et al. | 70/186 |
| 2007/0103010 A1 * | 5/2007 | Kouzu et al. | 310/51 |
| 2009/0267432 A1 * | 10/2009 | Henry et al. | 310/71 |
| 2011/0121667 A1 * | 5/2011 | Mori et al. | 310/51 |

FOREIGN PATENT DOCUMENTS

| | | |
|---|---|---|
| JP | 08-047195 | 2/1996 |
| JP | 2001-258199 | 9/2001 |
| JP | 3096975 | 7/2003 |
| JP | 2007-230350 | 9/2007 |
| JP | 2008137644 | 6/2008 |
| JP | 2008168863 | 7/2008 |

OTHER PUBLICATIONS

Japanese Office Action dated Mar. 15, 2011 and English Translation.

* cited by examiner

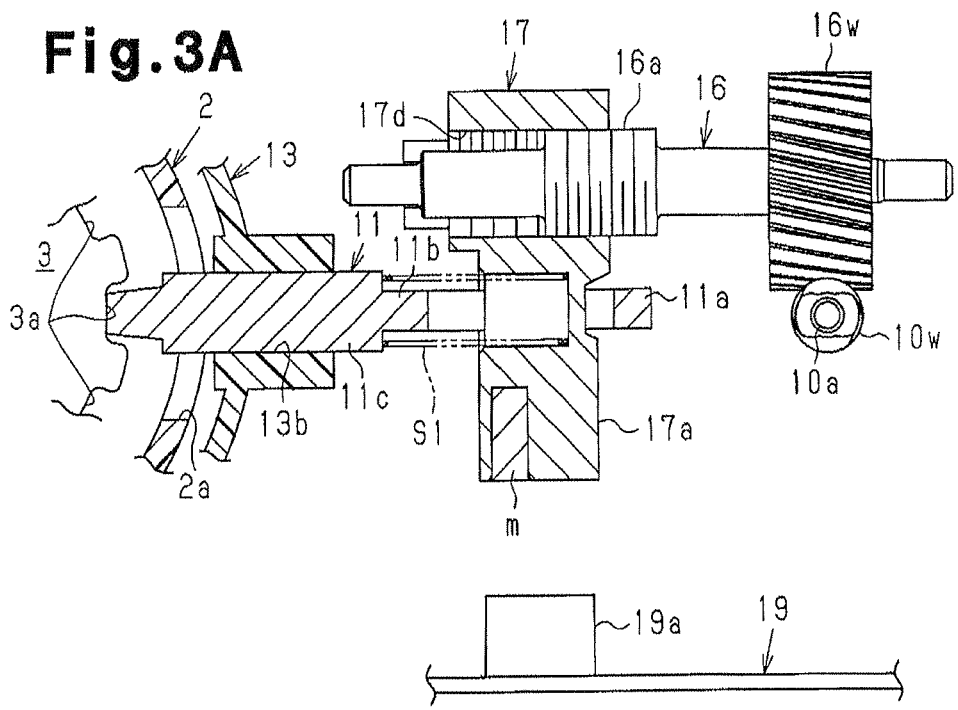
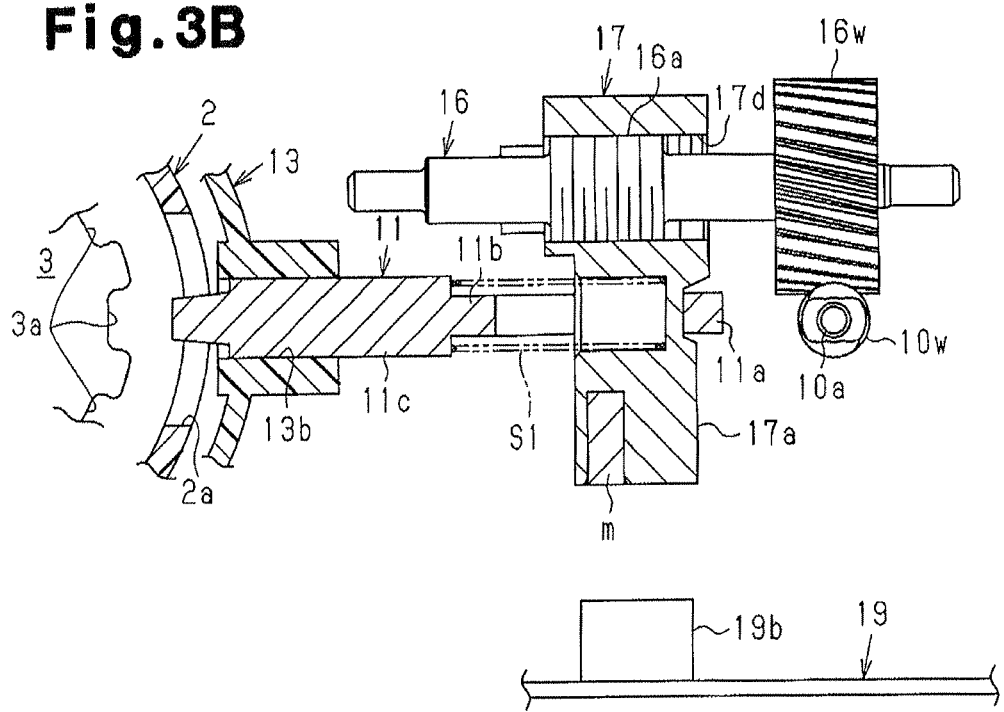

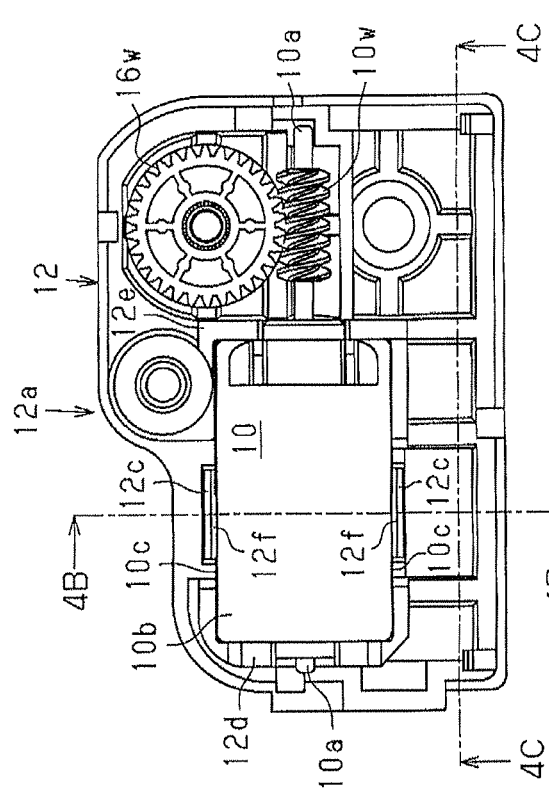
Fig.4A
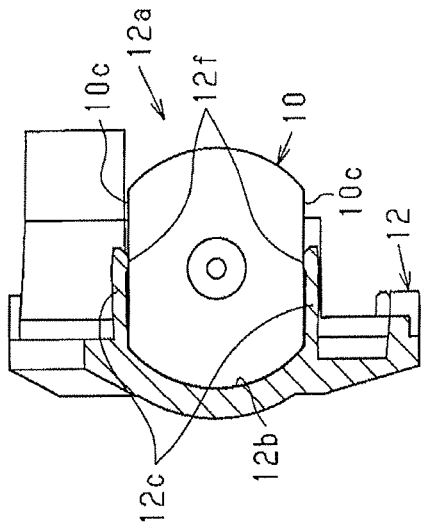
Fig.4B
Fig.4C

ELECTRIC STEERING WHEEL LOCK DEVICE AND MOTOR DAMPING STRUCTURE

CROSS-REFERENCE TO RELATED APPLICATIONS

This application is based upon and claims the benefit of priority from prior Japanese Patent Application No. 2008-258408, filed on Oct. 3, 2008, the entire contents of which are incorporated herein by reference.

BACKGROUND OF THE INVENTION

The present invention relates to an electric steering wheel lock device for switching a steering wheel of a vehicle between a lock state and an unlocked state to prevent the vehicle from being stolen, and a motor damping structure suitable for use in such an electric steering wheel lock device.

In recent years, vehicles, such as a four-wheel automobile, are equipped with a steering wheel lock device that moves a lock bar from an unlock position to a lock position to lock the steering wheel (steering shaft) and prevent theft of the vehicle.

There are mechanical type and electric type steering wheel lock devices. In a mechanical type steering lock device, a mechanical key is inserted into a key cylinder, which is located near the steering wheel, and turned to lock the steering wheel. In an electric type steering lock device, an electric drive source (actuator) reciprocates a lock bar relative to the steering shaft to fit the lock bar fit to the steering shaft and lock the steering wheel.

Japanese Laid-Open Patent Publication No. 2008-137644 describes an electric steering wheel lock device of the prior art. In this electric steering wheel lock device, an electric motor (DC motor), which serves as a drive source, transmits drive power to the lock bar through a gear mechanism to reciprocate the lock bar.

The electric steering wheel lock device includes a case member formed by a lid (lid member), which serves as a motor holding member for holding the electric motor, and a case body, to which the lid is attached, for accommodating the electric motor, the lock bar, and the gear mechanism. The case member (case body) is fixed by a bracket to a cylindrical column tube that surrounds the steering shaft.

In the prior art, the lid and the case body are die casted from magnesium (cast metal). However, highly rigid resin material is nowadays more used to form the lid and case body due to the recent trend for manufacturing light-weight vehicles.

In the electric steering wheel lock device of the above publication, when the electric motor is operated to lock or unlock the steering wheel, vibration generated by the electric motor is transmitted to the case member, the column tube, and the like through the lid. This generates noise and disturbs the silentness in the passenger compartment.

Japanese Laid-Open Patent Publication No. 2008-168863 (see FIG. 1) describes a technique for reducing the transmission of vibration from an electric motor. The publication describes a non-woven fabric adhered around the casing of an electric motor. The electric motor is pressed into and fixed to a motor fastening portion, which is arranged in the lid, together with the non-woven fabric.

In this technique, however, the non-woven fabric is discrete from the lid, which holds the electric motor. This results in an increase in the number of parts, which contradicts the demand for fewer parts in an automobile.

Japanese Laid-Open Utility Model Publication No. 7-40290 describes a vibration damping technique. This technique is not used for an electric steering wheel lock device but used for an electric retractable door mirror device. The publication describes (FIG. 1, paragraph 0021) a mirror retracting electric motor 10 is held by two elastic arms 44 arranged facing toward each other on a plate 41, which is formed by an elastic member. Vibration generated when driving the electric motor 10 is absorbed by the elastic arms 44. The plate 41 is formed from polyacetal resin, rubber, or the like and is thereby elastic.

The upper side of a casing for the electric motor 10 is clamped by the elastic arms 44. Furthermore, engagement tabs 45 arranged at the distal ends of the elastic arms 44 are engage with the corners of the electric motor 10. This holds the electric motor 10 on the plate 41.

Japanese Laid-Open Utility Model Publication No. 7-40290 describes the absorption of vibration in the direction of the rotation shaft of the electric motor 10 to suppress transmission of vibration to a unit bracket 5 through the plate 41.

However, as discussed in Japanese Laid-Open Utility Model Publication No. 7-40290 (FIG. 1 and paragraph 0021), the effect of suppressing transmission of vibration is assumed to be mainly obtained by an urethane cushion 49 arranged between the electric motor 10 and the plate 41.

Therefore, the cushion 49 increases the number of parts even if the technique described in publication is applied to the electric steering wheel lock device. Furthermore, the lid of the electric steering wheel lock device corresponding to the elastic arms 44 is formed from a die-cast product or highly rigid resin material as described above. In addition, the lid comes into planar contact with the electric motor 10 and the elastic arms 44. Thus, with the technique of Japanese Laid-Open Utility Model Publication No. 7-40290, it is rather difficult to sufficiently suppress the transmission of vibration.

SUMMARY OF THE INVENTION

The present invention provides an electric steering wheel lock device for effectively suppressing the transmission of vibration from an electric motor to an external environment.

One aspect of the present invention is an electric steering wheel lock device including a lock bar movable between a lock position, at which the lock bar prohibits rotation of a steering shaft, and an unlock position, at which the lock bar permits rotation of the steering shaft. An electric motor generates drive force for moving the lock bar and includes a casing. A motor holding member holds the electric motor and includes a motor fastening portion having two contact portions facing toward each other to clamp the casing of the electric motor.

A further aspect of the present invention is a motor damping structure for suppressing vibration of an electric motor. The motor damping structure includes a motor holding member which holds the electric motor. The motor holding member includes a motor fastening portion having two contact portions facing toward each other to clamp a casing of the electric motor.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3A is a cross-sectional view showing a lock state in which a lock bar is engaged with a steering shaft;

FIG. 3B is a cross-sectional view showing an unlocked state in which the lock bar is disengaged from the steering shaft;

FIG. 4A is a plan view showing an inner side of the lid when the electric motor is fastened to a motor fastening portion;

FIG. 4B is a cross-sectional view taken along line 4B-4B in FIG. 4A;

FIG. 4C is a cross-sectional view taken along line 4C-4C in FIG. 4A;

DETAILED DESCRIPTION OF THE PREFERRED EMBODIMENTS

Figure 1:
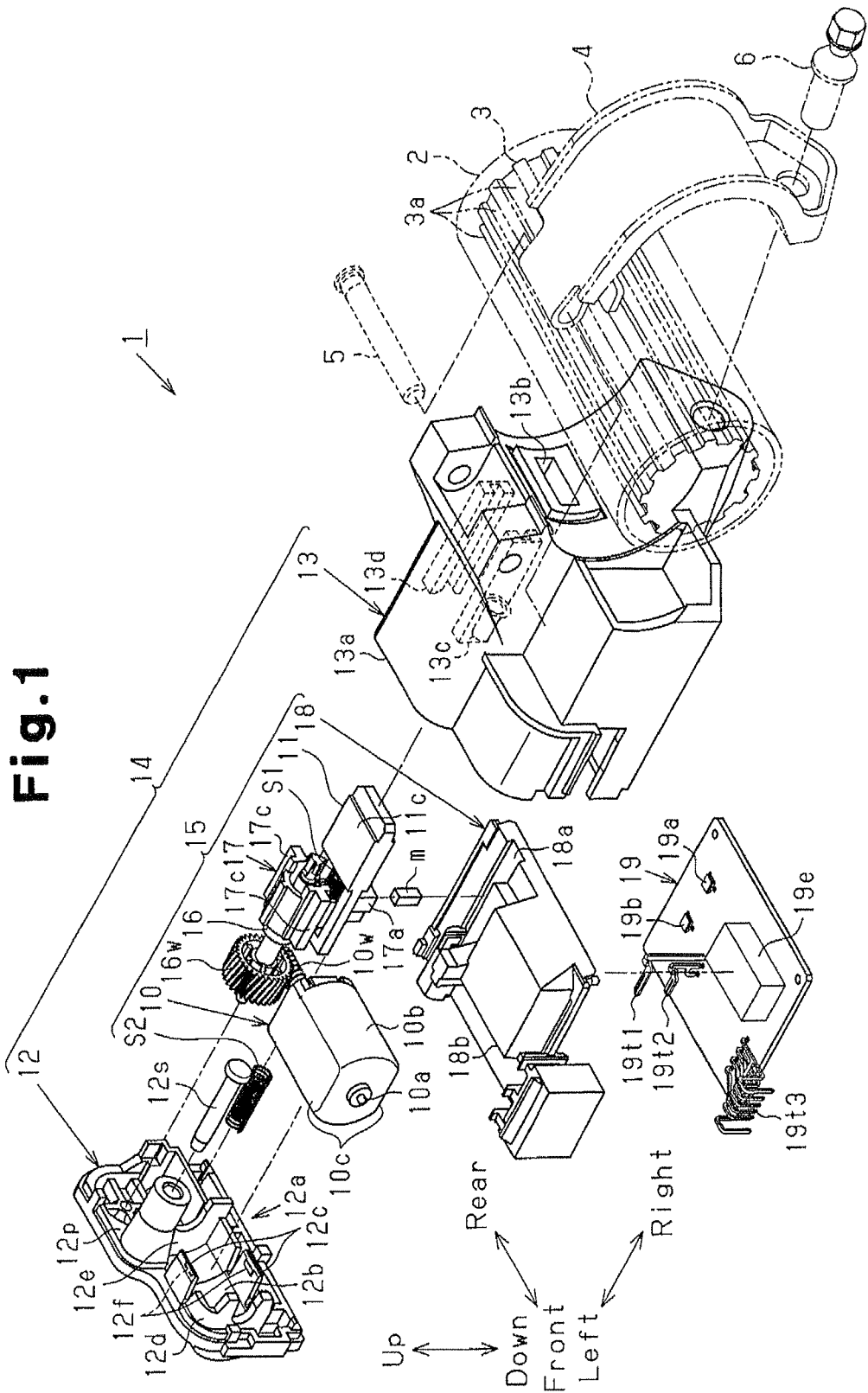
FIG. 1 is a perspective exploded view showing the entire structure of a preferred embodiment of an electric steering wheel lock device coupled to a column tube.

In the drawings, like numerals are used for like elements throughout.

A preferred embodiment of an electric steering wheel lock device according to the present invention will now be discussed with reference to the drawings.

As shown in FIG. 1, a cylindrical column tube 2, which is formed from a resin, is arranged near a driver's seat in a vehicle such as an automobile. A metal steering shaft 3, which connects the steering wheel to and the vehicle wheels (none shown) is rotatably accommodated in the column tube 2. A plurality of spline grooves 3a are formed in the outer surface of the steering shaft 3 extending in the axial direction of the steering shaft 3. The steering shaft 3 is rotated when the steering wheel is rotated. The vehicle wheels are steered to a steering angle corresponding to the rotated angle of the steering wheel.

The column tube 2 includes an electric steering wheel lock device 1, which switches the steering wheel between a locked and an unlocked state. The steering wheel lock device 1 prohibits unauthorized operation of the steering wheel by a third person and prevents the vehicle from being stolen. When the steering wheel lock device 1 is in the locked state, the steering wheel is also in the lock state. This prohibits rotation of the steering wheel. When the steering wheel lock device 1 is in the unlocked state, rotation of the steering wheel is allowed, and the steering wheel is in the unlocked state.

The steering wheel lock device 1 is applied to a vehicle in which the engine is started by pushing a start switch (not shown) arranged in the passenger compartment. When the gearshift lever is located at the parking position and the driver operates the start switch while depressing the brake pedal, and ECU (not shown) arranged in the vehicle sets the steering wheel lock device 1 to the unlocked state. The steering wheel lock device 1 is set to the locked state when the driver gets out of the vehicle and closes the door.

As shown in FIG. 1, the steering wheel lock device 1 includes a lock mechanism 15 and uses an electric motor (DC motor) 10 as a drive source. The electric motor 10 transmits the drive force to a lock bar 11 through a gear mechanism to reciprocate the lock bar 11. The lock bar 11, which is formed from carbon steel used for mechanical structures (symbol: S45C), includes a plate-shaped distal portion 11c. The electric motor 10 includes a rotation shaft 10a, which extends in the axial direction, a rotor (not shown) rotated integrally with the rotation shaft 10a, and a fixed stator (not shown). The electric motor 10 also includes a casing 10b for accommodating the rotor and the stator. The casing 10b includes two side surfaces 10c facing toward each other in the vertical direction. A worm 10w is fixed to the rotation shaft 10a of the electric motor 10. As one example, RE-280 (model number) manufactured by Mabuchi Motor Co. is used as the electric motor 10. The rotation shaft 10a is rotated by direct current (DC) power supplied from an in-vehicle power supply (not shown).

The steering wheel lock device 1 also includes a case member 14. The case member 14 includes a lid 12 (lid member), which serves as a motor holding member for holding the electric motor 10, and a case body 13, which has an opening 13a into which the lid 12 is fitted. The case body 13 accommodates the electric motor 10 and the lock mechanism 15, which includes the lock bar 11. Such accommodated items are sealed in the case body 13 when the lid 12 is fitted to the opening 13a. The lid 12 is integrally coupled to the case body 13 by a screw 12s extending through an inner part 13c of the case body 13.

A generally arcuate bracket 4 supports the column tube 2 on the case body 13. The bracket 4 is fastened to the case body 13 by, for example, a pin 5 and a screw 6. In the steering wheel lock device 1 shown in FIG. 1, the case member 14, which includes the lid 12 and case body 13, is formed from a highly rigid material such as polyamide 66.

Figure 2:
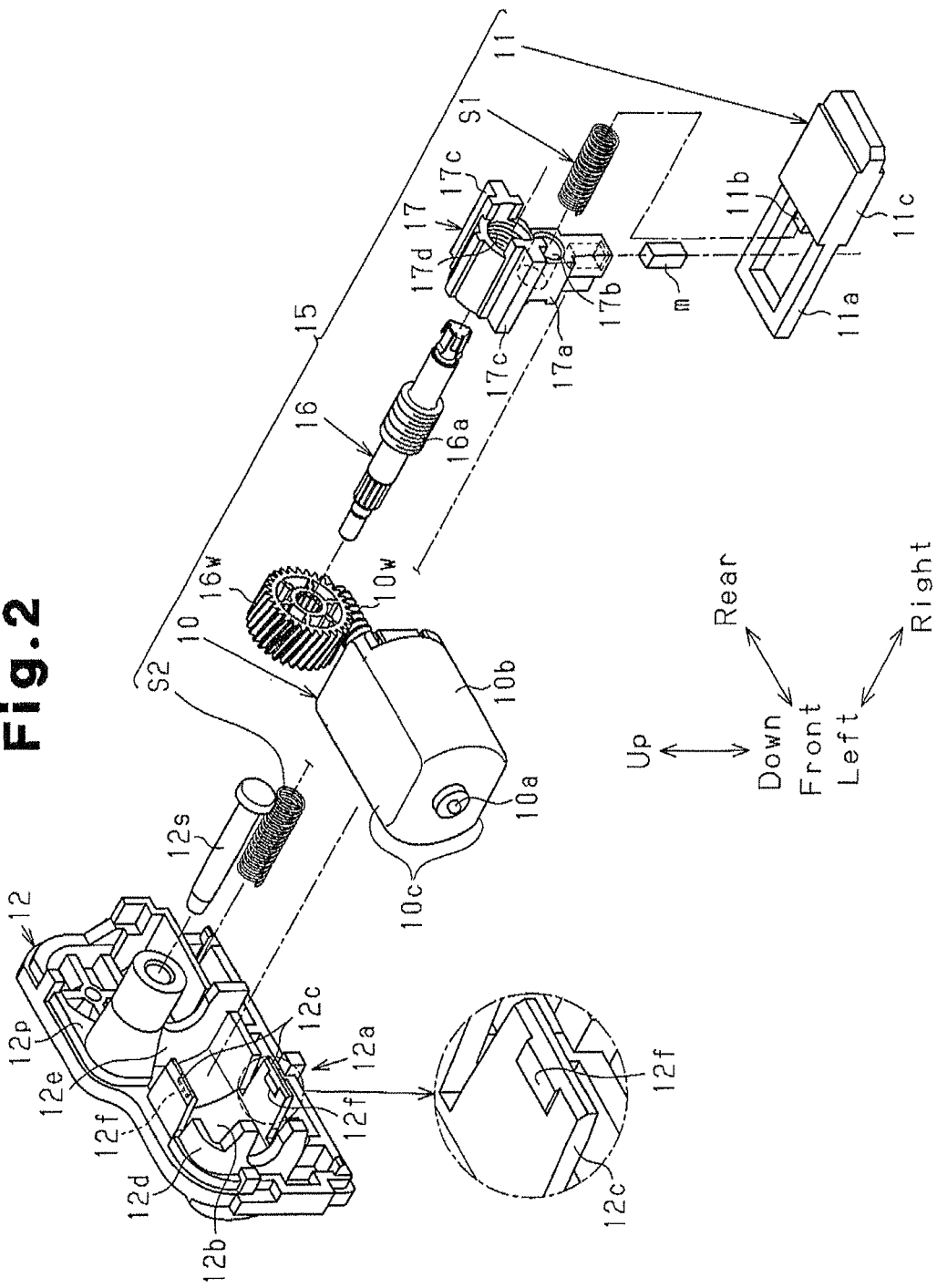
FIG. 2 is a perspective exploded view showing a lock mechanism in the electric steering wheel lock device of FIG. 1.

As shown in FIGS. 1 and 2, a motor fastening portion 12a is defined on an inner surface of the lid 12. The casing 10b of the electric motor 10 is fastened to the motor fastening portion 12a, which is, preferably, integrally formed with the lid 12. As shown in FIG. 2, the motor fastening portion 12a includes a holding recess 12b and two casing clamping portions, or casing clamping tabs 12c. The holding recess 12b, which has a generally U-shaped cross-section which is arranged in a plate-shaped lid body 12p, holds the casing 10b of the electric motor 10. The two casing clamping tabs 12c, which extend from the lid body 12p, clamp the casing 10b. The motor fastening portion 12a further includes two supports 12d and 12e, which supporting the casing 10b, at two positions, an axially frontward position and an axially rearward position. As shown by the encircled enlarged view in FIG. 2, two contact portions 12f project toward each other from the distal ends of the two casing clamping tabs 12c. The two contact portions 12f hold the casing 10b in between while applying side pressure to the casing 10b of the electric motor 10. Each contact portion 12f is tetragonal and has a trapezoidal cross-section. The contact portions 12f of the casing clamping tabs 12c and 12c clamp and hold the electric motor 10 in a fixed in the holding recess 12b. This holding structure allows for the electric motor 10 to be easily attached to and detached from the motor fastening portion 12a.

The lock mechanism 15 includes the lock bar 11, which is reciprocated between the lock position and the unlock position by the electric motor 10, and a shaft 16, which extends in a sideward direction so orthogonal to the rotation shaft 10a of the electric motor 10, as viewed in FIGS. 1 and 2. The shaft 16 is formed from carbon steel used for mechanical structures (symbol: S20C).

The lock mechanism 15 further includes a worm wheel 16w, which is fixed to the left side of the shaft 16 and mated with the worm 10w of the electric motor 10 to transmit the rotational force of the rotation shaft 10a to the shaft 16. As shown in FIG. 2, the lock mechanism 15 further includes a lock stopper 17, which is reciprocated in the sideward direction as the shaft 16 rotates. The lock stopper 17 has a hole 17d, which receives a threaded large diameter portion 16a of the shaft 16. The lock stopper 17 is die casted from a non-magnetic metal such as zinc. Further, the lock stopper 17 also has a lower portion 17a, which receives a magnet m.

As shown in FIG. 2, two guide pieces 17c project from the lock stopper 17 extending along the axial direction of the shaft 16. As shown in FIG. 1, two rails 13d are formed on the inner surface of the case body 13 to guide the guide pieces 17c in the sideward direction (i.e., axial direction of shaft 16).

In the preferred embodiment, the lock stopper 17 is formed from a non-magnetic metal, as described above. This is because if the lock stopper 17 is formed from a magnetic metal such as steel, the magnetic detection of the position of the lock bar 11, which will be described later, would be adversely affected.

As shown in FIGS. 1 and 2, the lock mechanism 15 further includes a spring S1, which is arranged between the lock bar 11 and the lock stopper 17, to biasing the lock bar 11 from the lock stopper 17 towards the steering shaft 3.

The lock bar 11 preferably includes the spring S1 and a rectangular frame 11a that surrounds a lower portion 17a of the lock stopper 17. The lock bar 11 further includes a projection 11b, which is projected into the frame 11a. The spring S1 has one end fixed to the projection 11b of the lock bar 11 and another end accommodated in a receptacle 17b formed in the lower portion 17a of the lock stopper 17. This holds the spring S1 between the lock bar 11 and the lock stopper 17.

When the lock stopper 17 moves toward the right, the lock stopper 17 forces and moves the lock bar 11 toward the right with the spring S1, as viewed in FIG. 2. When the lock stopper 17 moves toward the left, the lock stopper 17 forces and moves the frame 11a of the lock bar 11 toward the left. The lock mechanism 15 shown in FIGS. 1 and 2 further includes a spring 52, which is arranged between the lock stopper 17 and the lid 12 to stably hold the lock stopper 17 and bias the lock stopper 17 towards the steering shaft 3.

With reference to FIG. 1, the lock mechanism 15 includes a resin guide member 18, which guides the lock stopper 17 in the lateral direction. The guide member 18 includes a guide groove 18a, which movably receives the lower portion 17a of the lock stopper 17. The guide member 18 also includes a pressing portion 18b for pressing the electric motor 10 against the holding recess 12b from the right.

The guide member 18 covers a circuit board 19 to which are connected various types of electronic components including hall element ICs 19a and 19b, which are used to detect the position of the lock bar 11, and connection terminals 19t1, 19t2, and 19t3. The circuit board 19, which is covered by the guide member 18, is accommodated in the case body 13 together with the lock mechanism 15. The hall IC 19a is arranged on the circuit board 19 so as to be located near the magnet m, which is arranged in the lower portion 17a of the lock stopper 17, when the lock bar 11 reaches the lock position. The hall IC 19b is arranged on the circuit board 19 so as to be located near the magnet m when the lock bar 11 reaches the unlock position.

The circuit board 19 includes a steering wheel lock ECU 19e, which detects the position of the lock bar 11 from the signals output from the hall ICs 19a and 19b and drive controls the electric motor 10. If a lock request command is received from an in-vehicle ECU (not shown) when the electric steering wheel lock device 1 is in the unlocked state, the steering wheel lock ECU 19e produces rotation with the electric motor 10 in one direction to move the lock bar 11 to the lock position and switch the steering wheel lock device 1 to the lock state. If an unlock request command is received from the in-vehicle ECU when the electric steering wheel lock device 1 is in the lock state, the steering wheel lock ECU 19e produces rotation with the electric motor 10 in the other direction to move the lock bar 11 to the unlock position and switch the steering wheel lock device 1 to the unlocked state.

The operation of the lock mechanism 15 will now be described in detail. As shown in FIGS. 3A and 3B, when the rotation shaft 10a of the electric motor 10 rotates, the rotational force of the electric motor 10 is transmitted to the shaft 16 by the worm 10w and the worm wheel 16w, which are mated with each other. The shaft 16 is engaged with the lock stopper 17 in a reciprocative manner (see FIG. 2). The lock stopper 17 thus reciprocates toward the left and right along the guide groove 18a (see FIG. 1) of the guide member 18 as the shaft 16 rotates.

Specifically, when the electric motor 10 is driven to move the lock stopper 17 toward the left (toward the steering shaft 3) as viewed in FIG. 3A, the lock stopper 17 forces the lock bar 11 with the spring S1 toward the left to the lock position. In this state, the distal end of the lock bar 11 passes through an insertion hole 13b, which extends through the case body 13, and a through hole 2a, which extends through the column tube 2, and becomes engaged with one of the spline grooves 3a of the steering shaft 3. This sets the steering wheel lock device 1 in the lock state and prohibits rotation of the steering shaft 3, or the steering wheel. The hall IC 19a of the circuit board 19 detects the magnetic flux density of the magnet m. When the magnetic flux density detected by the hall IC 19a exceeds a predetermined threshold value, the steering wheel lock ECU 19e determines that the lock bar 11 is located at the lock position and stops driving the electric motor 10.

When the electric motor 10 is driven to move the lock stopper 17 toward the right as viewed in FIG. 3B, the lock stopper 17 contacts the frame 11a of the lock bar 11 and moves the lock bar 11 toward the right to the unlock position. In this state, the lock bar 11 is disengaged from the steering shaft 3. This sets the steering wheel lock device 1 in the unlocked state and permits rotation of the steering shaft 3, or the steering wheel. The hall IC 19b of the circuit board 19 detects the magnetic flux density of the magnet m. When the magnetic flux density detected by the hall IC 19b exceeds a predetermined threshold value, the steering wheel lock ECU 19e determines that the lock bar 11 is located at the unlock position and stops driving the electric motor 10. The worm wheel 16w, which is mated with the worm 10w, reduces the speed of the rotation produced by the electric motor 10 at a predetermined speed reduction ratio to ensure generation of the torque necessary for the reciprocative movement of the lock bar 11.

As shown in FIGS. 4A to 4C, in the steering wheel lock device 1 of the preferred embodiment, the motor fastening portion 12a for clamping and fixing the casing 10b of the electric motor 10 with the two contact portions 12f, which face toward each other, is formed integrally with the lid 12. The two contact portions 12f are respectively arranged on the two casing clamping tabs 12c, which project from the lid body 12p (see FIG. 1).

The two contact portions 12f forcibly suppress the vibration (vibration in a direction perpendicular to each side surface 10c) that appears as oscillation of the casing 10b when the electric motor 10 is driven. The vibration of the electric motor 10 is thus not transmitted to the lid 12 and the case body 13 and thereby not transmitted to an external environment such as the driver's seat through the column tube 2. It is therefore preferable that the casing 10b of the electric motor 10 be clamped and fixed with the two contact portions 12f. The vibration that is generated when the electric motor 10 is driven is also referred to as magnetic vibration. The magnetic vibration is assumed to be generated in an air gap formed between the rotor accommodated in the casing 10b and the stator fixed to the casing 10b.

As shown in FIG. 4C, the motor fastening portion 12a preferably clamps and holds the central part of each side surface 10c, which has a generally rectangular shape, of the casing 10b for the motor 10 with the two contact portions 12f. In other words, the two contact portions 12f clamp and fix the casing 10b at a region at which the diagonal lines intersect each other on each of the rectangular side surfaces 10c. In this manner, the central part of each side surface 10c, at which the vibration becomes maximum in the casing 10b, is clamped and fixed by the two contact portions 12f. This efficiently obtains the effect of forcibly suppressing the vibration generated by the casing 10b of the electric motor 10.

A state in which the electric motor 10 is held in a fixed state by the two casing clamping tabs 12c of the motor fastening portion 12a in the preferred embodiment will now be discussed. The operation of the casing clamping tabs 12c is symmetric in the vertical direction as viewed in FIGS. 1, 2, 4A, and 4B and thus will be described below using only the lower casing clamping tab 12c.

Figure 5A:
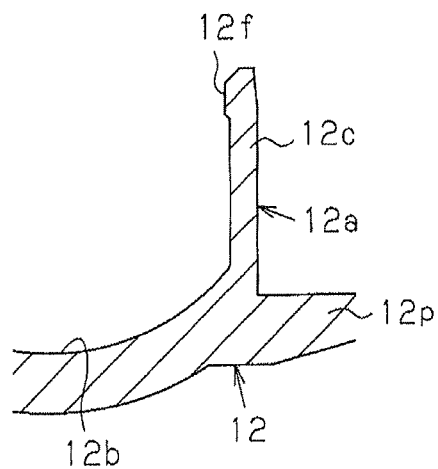
FIG. 5A is a partial cross-sectional view of a casing clamping portion (motor fastening portion) in a state before the electric motor is fastened to the motor fastening portion.
Figure 5B:
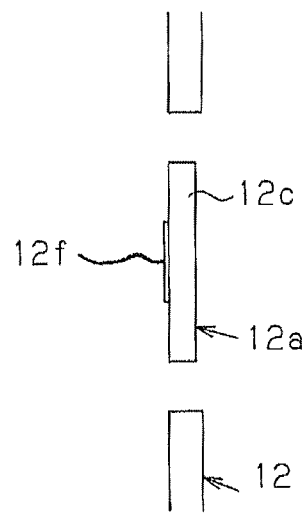
FIG. 5B is a plan view of the casing clamping portion in the state of FIG. 5A.

First, FIGS. 5A and 5B show a state in which the electric motor 10 is not held in the holding recess 12b. In this state, the two casing clamping tabs 12c extend upright from the lid body 12p, and the contact portion 12f of each casing clamping tab 12c extends inward to the holding recess 12b.

Figure 5C:
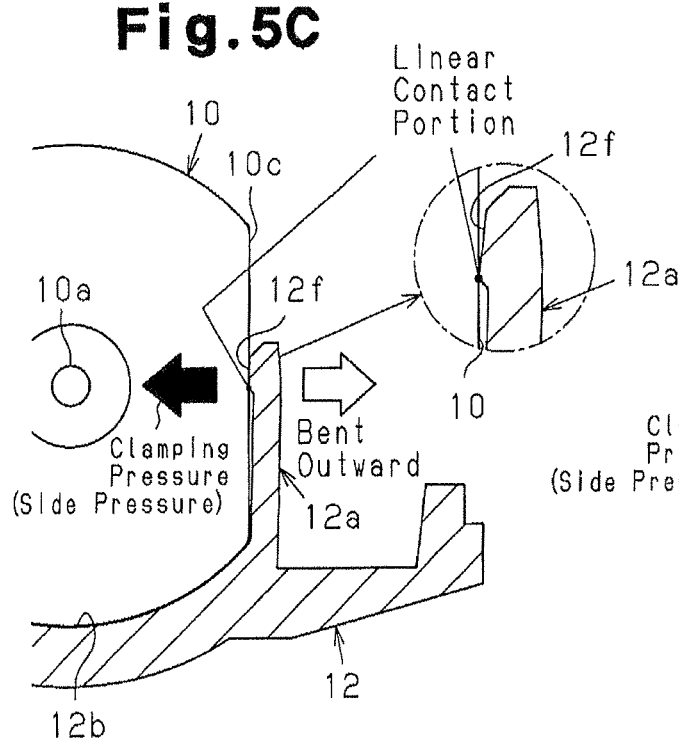
FIG. 5C is a partial cross-sectional view of the casing clamping portion (motor fastening portion) showing a state after the electric motor is fastened to the motor fastening portion.
Figure 5D:
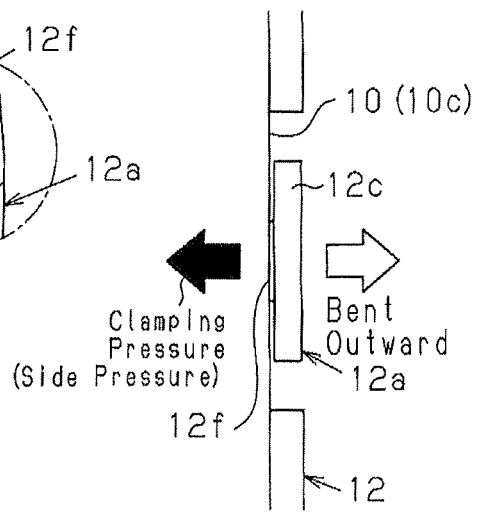
FIG. 5D is a plan view showing the casing clamping portion in the state of FIG. 5C.

FIGS. 5C and 5D show a state in which the electric motor 10 is held in the holding recess 12b. The two casing clamping tabs 12c are formed from a highly rigid resin material (nylon 66) and have suitable elasticity (flexibility). Thus, when the electric motor 10 is held in the holding recess 12b, the casing clamping tabs 12c slightly bend (deflect) outward. Therefore, when bent outward, the casing clamping tabs 12c hold the casing 10b in a fixed state with the contact portions 12f while applying, as a reactive force, clamping pressure (side pressure) to the side surfaces 10c of the casing 10b for the electric motor 10. The contact portion 12f has a tetragonal upper surface and a trapezoidal cross-section. When bent outward as described above, as shown in FIG. 5C, the upper surface of the contact portion 12f inclines relative to the corresponding side surface 10c of the electric motor 10. Therefore, the casing 10b of the electric motor 10 comes into linear contact with the lower side of the upper surface of each contact portion 12f. That is, the region of contact between the casing 10b and each contact portion 12f is linear. Referring to FIGS. 1 and 2, the linear region of contact extends in the axial direction of the electric motor 10. In other words, each region of contact extends in a direction orthogonal to the detaching direction of the electric motor 10. This keeps the electric motor 10 stably held in the holding recess 12b. Furthermore, the two regions of contact are arranged at the same height from the holding recess 12b and, in particular, at positions corresponding to the rotation shaft 20a, or axis, of the electric motor 10. This further stably holds the electric motor 10 in a state clamped and fixed by the two casing clamping tabs 12c.

The electric steering wheel lock device 1 of the preferred embodiment has the advantages described below.

(1) The casing 10b of the electric motor 10, which is a drive source, is clamped and held in a fixed state by the two contact portions 12f of the motor fastening portion 12a. The two contact portions 12f forcibly suppress the vibration that appears as oscillation of the casing 10b when the electric motor 10 is driven. This efficiently suppresses the transmission of vibration from the electric motor 10 to the lid 12 and, ultimately, the external environment such as the driver's seat. Accordingly, the silentness of the passenger compartment is maintained. Moreover, the casing 10b is held in the holding recess 12b while the two contact portions 12f apply clamping pressure (side pressure) to the casing 10b of the electric motor 10. The electric motor 10 is thus stably fastened to the motor fastening portion 12a without using other motor fastening members. The two contact portions 12f also limit the path in which vibration is transmitted from the vehicle to the electric motor 10. This suppresses the transmission of vehicle vibration to the electric motor 10 and obtains a secondary effect in which undesirable influence of the vehicle vibration on the electric motor 10 is effectively eliminated.

(2) The motor fastening portion 12a, which includes the two contact portions 12f, is formed integrally with the lid 12. The lid 12 solely holds the electric motor 10 and suppresses the transmission of vibration. This eliminates the need for a vibration absorption material such as non-woven fabric or a rubber sheet and thereby reduces the number of parts.

(3) The two contact portions 12f of the motor fastening portion 12a come into linear contact with the casing 10b of the electric motor 10. This structure enhances the vibration suppression effect of the casing 10b. Therefore, the transmission of vibration from the electric motor 10 to the lid 12 is further effectively suppressed.

(4) The two contact portions 12f of the motor fastening portion 12a clamp the central part of each side surface 10c at which vibration of the casing 10b is maximum. This further improves the vibration suppression effect of the casing 10b. Moreover, the electric motor 10 is held in a fixed state by the motor fastening portion 12a near its center of gravity thereof. This stabilizes the fixed state of the electric motor 10.

(5) The motor fastening portion 12a included the holding recess 12b, which holds the casing 10b of the electric motor 10, and the two casing clamping tabs 12c, which project from the lid body 12p to clamp the casing 10b. Thus, the electric motor 10 is easily fastened to the lid 12, and the assembly of the electric steering wheel lock device 1 is simplified. Furthermore, the two contact portions 12f are respectively arranged on the two casing clamping tabs 12c so as to project inward to the holding recess 12b. Therefore, in the same manner as a vibration absorption material such as a non-woven fabric or a rubber sheet, the two contact portions 12f suitably absorb tolerances when fastening the electric motor 10 to the lid 12, while obtaining the vibration suppression effect. Further, the two casing clamping tabs 12c project from the lid body 12p and are thus subtly deformed even when the lid body 12p is deformed by heat or wear. This ensures that the electric motor 10 is continuously held in a fixed state.

(6) The motor fastening portion 12a is formed from nylon 66, which is a highly rigid resin material. The elasticity of the two casing clamping tabs 12c is such that it enables the casing 10b of the electric motor 10 to be held in a fixed state with the two contact portions 12f. Therefore, the motor fastening portion 12a effectively clamps the electric motor 10 with the two casing clamping tabs 12c by effectively using the elasticity (flexibility) of the resin material. This effectively suppresses vibration of the casing 10b for the electric motor 10.

(7) The holding recess 12b and the two casing clamping tabs 12c are formed from a resin material. This eliminates metal impinging noise generates when the metal casing 10b impinges the holding recess 12b or the two casing clamping tabs 12c when the electric motor 10 is driven.

It should be apparent to those skilled in the art that the present invention may be embodied in many other specific forms without departing from the spirit or scope of the invention. Particularly, it should be understood that the present invention may be embodied in the following forms.

The motor fastening portion 12a, which includes the two contact portions 12f, may be discrete from the lid 12 (motor holding member). Alternatively, only the two casing clamping tabs 12c may be discrete from the lid 12. Furthermore, only the two contact portions 12f may discrete from the lid 12.

Instead of linear contact, the two contact portions 12f may come into point contact with the casing 10b of the electric motor 10. This improves the effect for suppressing vibration of the casing 10b and further effectively suppresses transmission of vibration from the electric motor 10 to the motor fastening portion 12a.

In the above preferred and illustrated embodiment, the contact portion of the casing 10b (side surfaces 10c) and the two contact portions 12f linearly extends along the rotation shaft direction of the electric motor 10. Furthermore, the regions of contact are arranged at the same height from the holding recess 12b and are arranged at positions corresponding to the rotation shaft 10a of the electric motor 10. However, the linear regions of contact may extend in a direction intersecting the axis of the electric motor 10. Furthermore, the two regions of contact do not necessarily have to be arranged at the same height from the holding recess 12b. Additionally, the two contact portions do not have to be arranged at positions corresponding to the rotation shaft 10a of the electric motor 10. Moreover, the regions of contact do not have to form a straight line and may instead form a closed line, such as a circle or a polygon, or an open pattern (i.e., be C-shaped, V-shaped, etc.).

The lid 12, which includes the motor fastening portion 12a, does not necessarily have to be formed from nylon 66, and may be formed from other highly rigid resin materials, such as polyphenylene sulfide (PPS) and polybutylene telephtalate (PST).

In the above preferred and illustrated embodiment, the motor damping structure (structure in which the motor fastening portion 12a including the two contact portions 12f that clamp the casing 10b of the electric motor 10 is integrally formed with the lid 12) for suppressing vibration of the electric motor 10 is applied to the electric steering wheel lock device 1. However, the motor damping structure may also be applied to an electric actuator device using other electric motors such as an electric retractable door mirror device and an electric mirror device.

In the above preferred and illustrated embodiment, the position of the lock bar 11 is detected through an electromagnetic process using a magnet and hall ICs. However, the position of the lock bar 11 may be detected through a contact process, which uses a contact-type switch, or an optical process, which uses an optical sensor.

In the above preferred and illustrated embodiment, the lock bar 11 and the shaft 16 are formed from carbon steel used for mechanical structures (symbol: S20C, S45C) but may be cast from a non-magnetic metal, such as zinc, in the same manner as the lock stopper 17.

The present examples and embodiments are to be considered as illustrative and not restrictive, and the invention is not to be limited to the details given herein, but may be modified within the scope and equivalence of the appended claims.

What is claimed is:

1. An electric steering wheel lock device for installation to a steering shaft, the electric steering wheel lock device comprising:
   a lock bar movable between
      a lock position, at which the lock bar prohibits rotation of the steering shaft, and
      an unlock position, at which the lock bar permits rotation of the steering shaft;
   an electric motor adapted to generate a drive force for moving the lock bar; and
   a motor holding member which holds the electric motor, wherein the motor holding member includes:
      a holding recess configured to hold a casing of the electric motor,
      two casing clamping tabs extending in parallel to each other from the holding recess, and
      two contact portions projecting toward each other from the two casing clamping tabs to clamp two opposite side surfaces of the casing of the electric motor,
      wherein each of the contact portions includes a tetragonal upper surface and a trapezoidal cross-section,
      wherein the tetragonal upper surface of each contact portion is inclined relative to the corresponding one of the two opposite side surfaces of the casing of the electric motor so that one of four sides of the tetragonal upper surface of each of the two contact portions comes into linear contact with the casing along a rotation shaft direction of the electric motor.

2. The electric steering wheel lock device according to claim 1, wherein the two contact portions are formed integrally with the motor holding member.

3. The electric steering wheel lock device according to claim 1, wherein each of the two contact portions is arranged to clamp a central part of each the corresponding one of the two opposite side surfaces.

4. The electric steering wheel lock device according to claim 1, wherein the two casing clamping tabs are formed from a highly rigid resin material and has an elasticity enabling clamping of the electric motor with the two contact portions.

5. A motor damping structure comprising:
   an electric motor, which includes a casing; and
   a motor holding member which holds the electric motor, the motor holding member including:
      a holding recess configured to hold a casing of the electric motor,
      two casing clamping tabs extending in parallel to each other from the holding recess, and
      two contact portions projecting toward each other from the two casing clamping tabs to clamp two opposite side surfaces of the casing of the electric motor,
      wherein each of the contact portions includes a tetragonal upper surface and a trapezoidal cross-section,
      wherein the tetragonal upper surface of each contact portion is inclined relative to the corresponding one of the two opposite side surfaces of the casing of the electric motor so that one of four sides of the tetragonal upper surface of each of the two contact portions comes into linear contact with the casing along a rotation shaft direction of the electric motor.

* * * * *